United States Patent
Wakairo et al.

(10) Patent No.: US 9,228,655 B2
(45) Date of Patent: Jan. 5, 2016

(54) CONTROL APPARATUS AND CONTROL METHOD FOR VEHICLE ELECTRIC OIL PUMP

(71) Applicant: Hitachi Automotive Systems, Ltd., Hitachinaka-shi, Ibaraki (JP)

(72) Inventors: Masahiko Wakairo, Isesaki (JP); Naoki Okamoto, Isesaki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 14/212,259

(22) Filed: Mar. 14, 2014

(65) Prior Publication Data
US 2015/0025739 A1  Jan. 22, 2015

(30) Foreign Application Priority Data
Jul. 16, 2013  (JP) .................................. 2013-147476

(51) Int. Cl.
*F16H 61/00*  (2006.01)

(52) U.S. Cl.
CPC .................................. *F16H 61/0025* (2013.01)

(58) Field of Classification Search
CPC ........ F16H 61/0025; F04B 49/20; F04B 1/12; F04B 1/146; F04B 1/29; B60W 2520/10; B60W 20/00; B60W 2510/081; B60L 2240/421; F16D 48/066; F16D 2500/1066

USPC ........ 701/36, 22, 104, 51; 180/65.235, 65.28, 180/65.27, 65.285, 301, 302, 305, 65.275; 903/919; 192/85.63; 303/115.4; 417/426, 44.2; 210/90; 475/127

See application file for complete search history.

(56) References Cited

U.S. PATENT DOCUMENTS

| | | | |
|---|---|---|---|
| 2004/0141849 A1* | 7/2004 | Deneir et al. | 417/32 |
| 2013/0173104 A1* | 7/2013 | Miyamoto et al. | 701/22 |

FOREIGN PATENT DOCUMENTS

| | | | |
|---|---|---|---|
| JP | 2007196756 A | * | 8/2007 |
| JP | 2009-293649 A | | 12/2009 |
| JP | 2009293649 A | * | 12/2009 |
| JP | 2011195102 A | * | 10/2011 |

* cited by examiner

*Primary Examiner* — Marthe Marc-Coleman
(74) *Attorney, Agent, or Firm* — Crowell & Moring LLP

(57) ABSTRACT

A control apparatus and a control method that controls an electric oil pump that supplies oil to a power transmission device transmitting a drive force to an axle. The control apparatus changes a PWM frequency in a PWM control of the electric oil pump to a lower frequency, when a vehicle is in a pulled state, when a vehicle speed is high, when a power source is operated at a high rotational speed, when a discharge amount from the electric oil pump is large, or when a noise in a vehicle interior is large. Thus, a drive noise of the pump can be reduced, or the amount of heat generated in the pump drive circuit and power consumption can be reduced.

16 Claims, 10 Drawing Sheets

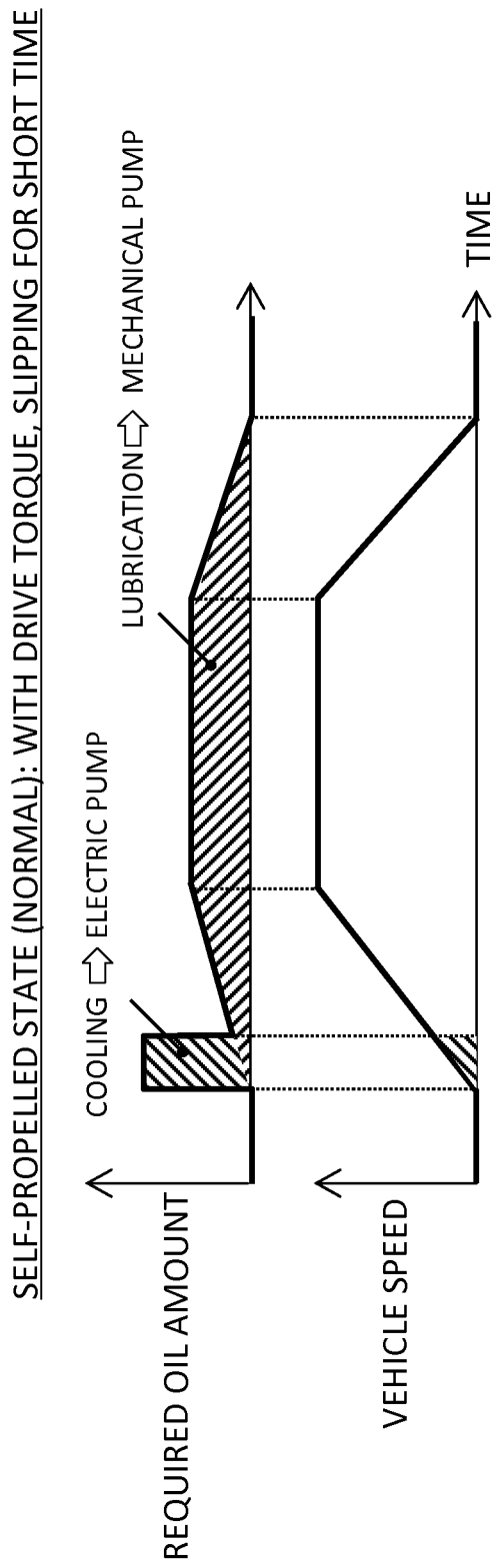

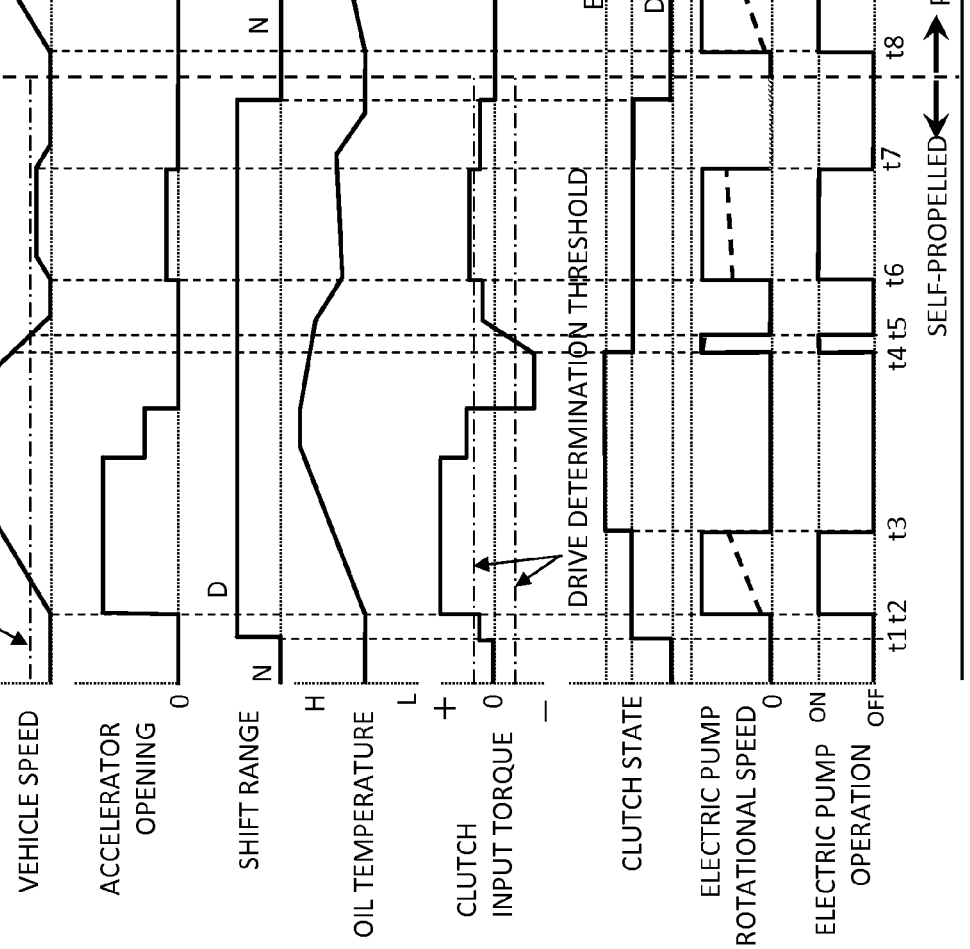

CONTROL APPARATUS AND CONTROL METHOD FOR VEHICLE ELECTRIC OIL PUMP

BACKGROUND OF THE INVENTION

1. Field of the Invention

The present invention relates to a control apparatus and to a control method that control an electric oil pump that supplies oil to a power transmission device transmitting a drive force to an axle.

2. Description of Related Art

Japanese Laid-open Patent Application Publication No. 2009-293649 discloses a technique, for use in a vehicle provided with a mechanical oil pump driven by an engine and an electric oil pump driven by a motor, as pumps for supplying oil to a power transmission device (such as a transmission and a start-up friction component) connected to the engine, the technique causing the electric oil pump to be driven during an idle reduction, in which the mechanical oil pump is stopped.

Here, as a drive frequency of the electric oil pump increases, a drive noise decreases. Thus, to decrease a noise level noticed by an occupant, it is desired to set a higher drive frequency.

However, if the drive frequency of the electric oil pump is high, an amount of heat generated in a drive circuit may be large compared to that at a lower drive frequency. Thus, in a situation in which the electric oil pump is continuously used, the drive circuit may be damaged by the heat.

The drive circuit can be prevented from being damaged by the heat when a heat-radiating property of the drive circuit is improved.

However, in a system in which the mechanical oil pump driven by the engine and the electric oil pump are provided, and the mechanical oil pump is mainly used while the electric oil pump is secondarily used, there may be the following problems.

That is, if the heat-radiating property of the drive circuit is improved such that sufficient heat-radiating performance can be obtained even when the electric oil pump is continuously used, cost may increase and the drive circuit may become large. Furthermore, if a lower drive frequency is set to suppress the heat generation amount, the noise may increase.

SUMMARY OF THE INVENTION

Thus, an object of the present invention is to provide a control apparatus and a control method for a vehicle electric oil pump, which can suppress the drive noise of the electric oil pump, and can suppress the increases in cost and size of the drive circuit of the electric oil pump, while preventing the drive circuit from being damaged by the heat.

To achieve the object, a control apparatus for a vehicle electric oil pump according to an aspect of the present invention includes a frequency setting unit that changes a drive frequency of the electric oil pump according to a state of a vehicle.

Furthermore, a control method for a vehicle electric oil pump according to an aspect of the present invention includes the steps of determining a state of a vehicle, and changing a drive frequency of the electric oil pump according to the state of the vehicle.

Other objects and features of aspects of the present invention will be understood from the following description with reference to the accompanying drawings.

BRIEF DESCRIPTION OF THE DRAWINGS

FIGS. 5A and 5B are timing diagrams schematically illustrating control patterns of the electric oil pump according to the embodiment of the present invention, FIG. 5A illustrating a control pattern in a state in which a vehicle is self-propelled, FIG. 5B illustrating a control pattern in a state in which the vehicle is pulled;

FIGS. 6A and 6B are timing diagrams illustrating detailed control patterns of the electric oil pump according to the embodiment of the present invention, FIG. 6A illustrating a control pattern in a state in which the vehicle is self-propelled, FIG. 6B illustrating a control pattern in a state in which the vehicle is pulled;

DESCRIPTION OF THE PREFERRED EMBODIMENTS

Hereinbelow, as an example of a control apparatus and a control method for a vehicle electric oil pump according to the present invention, an example applied to a hybrid vehicle will be described with reference to the accompanying drawings.

Figure 1:
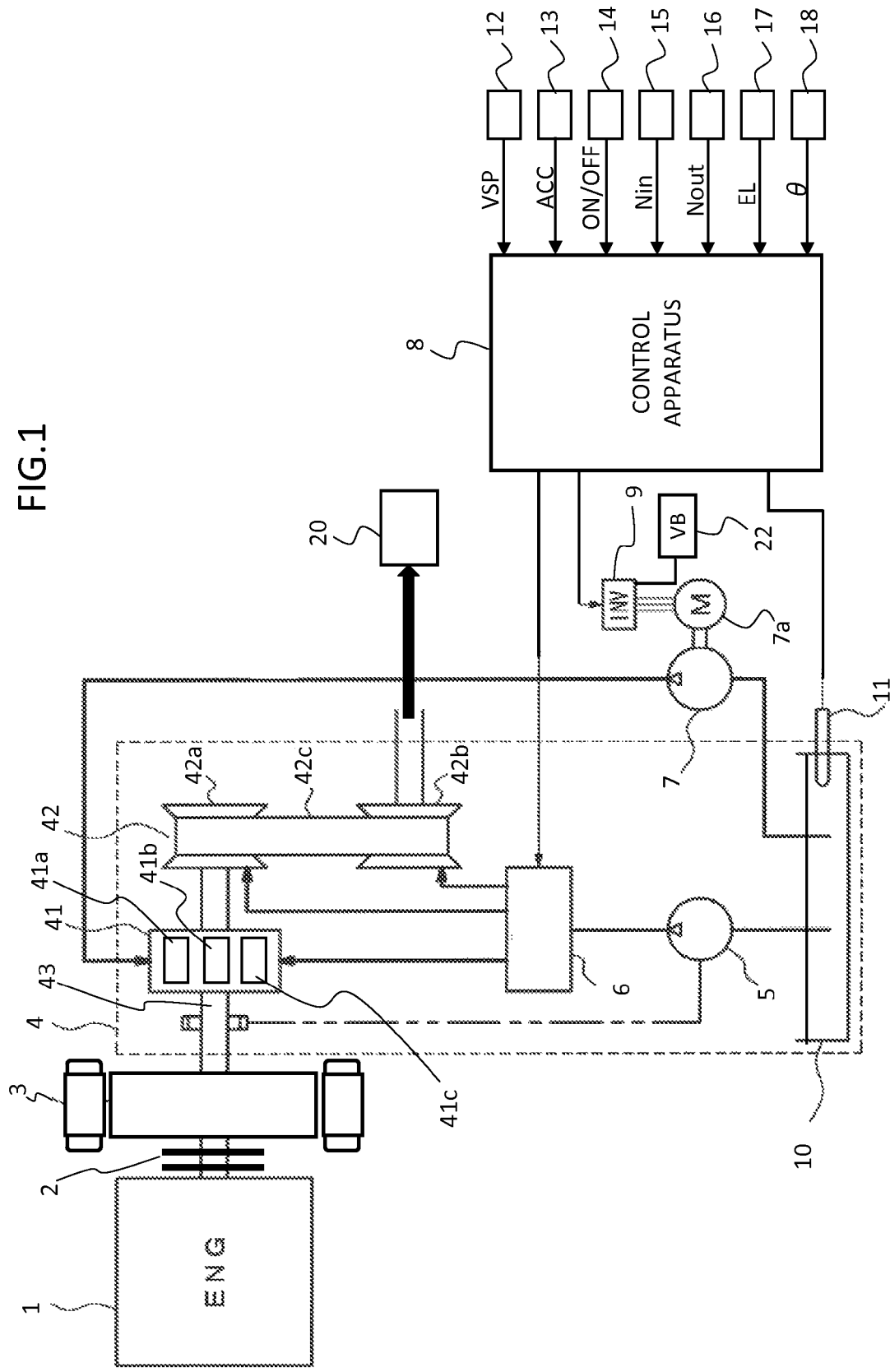
FIG. 1 is a view illustrating a drive system of a hybrid vehicle according to an embodiment of the present invention.

FIG. 1 illustrates a drive system of the hybrid vehicle.

The drive system of FIG. 1 is provided with an engine (internal combustion engine) 1, a first clutch 2, a motor generator 3 and a power transmission device 4, and an output of power transmission device 4 is transmitted to an axle 20.

Power transmission device 4 includes a forward-reverse switching mechanism 41 provided with a planetary gear mechanism 41a, a reverse brake 41b and a forward clutch (second clutch) 41c, and a continuously variable transmission mechanism 42.

Continuously variable transmission mechanism 42 includes a primary pulley 42a, a secondary pulley 42b and a V-belt 42c wrapped around these pulleys. Rotational motion of primary pulley 42a is transmitted to secondary pulley 42b through V-belt 42c, and rotational motion of secondary pulley 42b is transmitted to axle 20, to drive the vehicle.

In continuously variable transmission mechanism 42, a movable conical plate of primary pulley 42a and a movable conical plate of secondary pulley 42b are moved in an axial direction, to change a radius of a position contacting with V-belt 42c, so that a rotation ratio, that is, a transmission gear ratio, between primary pulley 42a and secondary pulley 42b can be changed.

Furthermore, a mechanical oil pump 5 that is driven by a rotating shaft 43 arranged between motor generator 3 and forward-reverse switching mechanism 41, is provided. Oil discharged from mechanical oil pump 5, which is driven to rotate by engine 1 and/or motor generator 3, is supplied to forward-reverse switching mechanism 41 and continuously variable transmission mechanism 42 via a pressure adjusting mechanism 6 for an oil-hydraulic operation, lubrication and cooling.

Furthermore, in parallel with mechanical oil pump 5, an electric oil pump 7 that is driven to rotate by an electric motor 7a is provided. Oil discharged from electric oil pump 7 is supplied to forward-reverse switching mechanism 41 for lubrication and cooling.

Operations of pressure adjusting mechanism 6 and electric oil pump 7 are controlled by a control apparatus 8 provided with a microcomputer.

Control apparatus 8 performs PWM control on an inverter 9, that is, a drive circuit of electric oil pump 7, to control the operation of electric oil pump 7. To inverter 9, a battery 22 is connected as a power supply.

As drive modes performed by the above-described drive system of the hybrid vehicle, two modes, that is, a hybrid drive mode and an electric drive mode are set. The hybrid drive mode is a mode in which first clutch 2 is engaged and engine 1 and motor generator 3 are used as a power source to drive the vehicle. Furthermore, the electric drive mode is a mode in which first clutch 2 is disengaged and motor generator 3 is used as the power source to drive the vehicle.

Control apparatus 8 receives output signals output from various sensors, which indicate states of the drive system.

As the various sensors, a temperature sensor 11 that measures a temperature TO of oil in an oil pan 10, a vehicle speed sensor 12 that measures a vehicle speed VSP, an accelerator opening sensor 13 that measures an accelerator opening ACC of a throttle pedal operated by a driver, a brake switch 14 that detects whether a brake is operated, an input rotation sensor 15 that measures an input-side rotational speed Nin of forward-reverse switching mechanism 41, an output rotation sensor 16 that measures an output-side rotational speed Nout of forward-reverse switching mechanism 41, a target drive force sensor 17 that obtains a target drive force EL of engine 1, a gradient sensor 18 that measures a gradient θ of a road surface, on which the vehicle runs, and the like.

Next, an example of control of electric oil pump 7 performed by control apparatus 8 will be described with reference to flowcharts of FIGS. 2-4.

Figure 2:
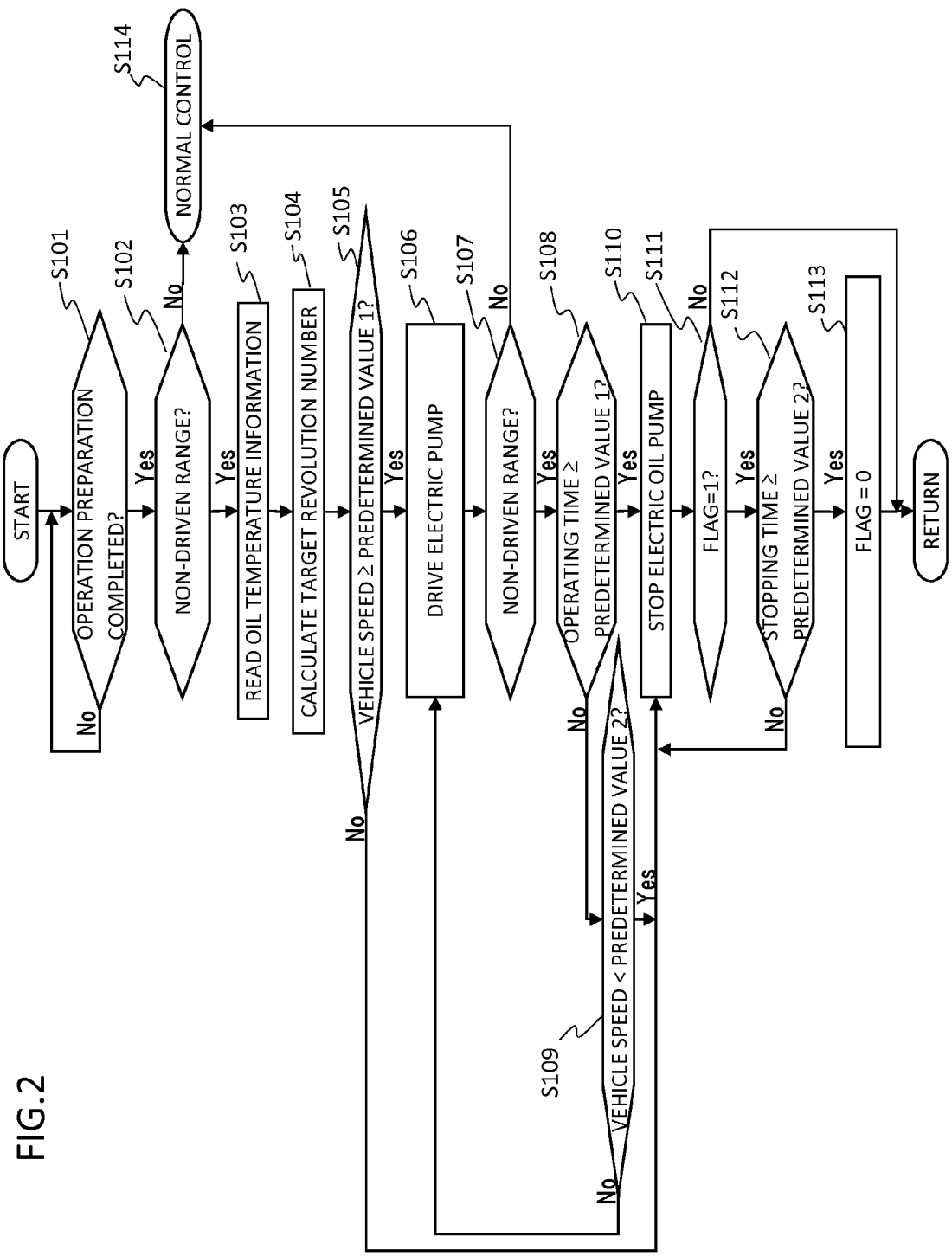
FIG. 2 is a flowchart illustrating control of an electric oil pump in a state in which a power transmission device is not driven (in a non-driven state of the power transmission device), according to the embodiment of the present invention.

A routine illustrated in the flowchart of FIG. 2 is executed by control apparatus 8 in a state in which an engine switch of the vehicle is turned on and thus power is applied to control apparatus 8.

The engine switch may be an ignition switch or a start switch, for example.

First, in step S101, control apparatus 8 determines whether operation preparation of electric oil pump 7 has been completed, while performing a resetting process, in which a drive experience flag of electric oil pump 7 is set to be zero.

A state in which the operation preparation of electric oil pump 7 has been completed is, for example, a state in which a relay for outputting electric power from battery 22 to electric oil pump 7 is turned on, and a battery voltage VB is within a predetermined range, and no occurrence of failure of electric oil pump 7 or inverter 9 has been detected.

When the operation preparation of electric oil pump 7 has been completed, that is, electric oil pump 7 is ready for operation, the operation of control apparatus 8 proceeds to step S102.

In step S102, control apparatus 8 determines whether forward-reverse switching mechanism 41 of power transmission mechanism 4 is in a driven state in which the drive force is transmitted or in a non-driven state in which the drive force is not transmitted.

Here, the driven state of forward-reverse switching mechanism 41 refers to a state in which a driven range is selected, and the non-driven state of forward-reverse switching mechanism 41 refers to a state in which a non-driven range is selected.

Control apparatus 8 determines whether forward-reverse switching mechanism 41 is in the driven state or in the non-driven state based on a range selection signal of a selector in an automatic transmission (AT).

Thus, control apparatus 8 determines that forward-reverse switching mechanism 41 is in the non-driven state, when the selector selects a neutral range, whereas control apparatus 8 determines that forward-reverse switching mechanism 41 is in the driven state, when the selector selects a drive range, other than the neutral range.

When control apparatus 8 determines in step S102 that forward-reverse switching mechanism 41 is in the driven state, the operation proceeds to step S114, in which normal control, which is control performed in the driven state of forward-reverse switching mechanism 41, is performed.

An example of the normal control in step S114, that is, the control in the driven state of forward-reverse switching mechanism 41, will be described with reference to the flowcharts of FIGS. 3 and 4.

Figure 3:
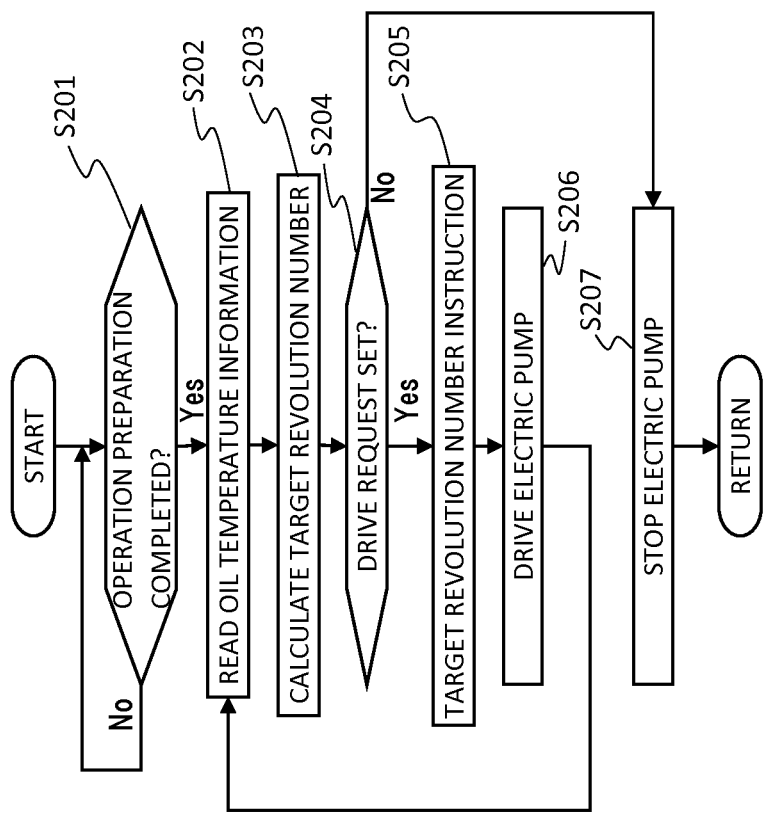
FIG. 3 is a flowchart illustrating control of the electric oil pump in a state in which the power transmission device is driven (in a driven state of the power transmission device), according to the embodiment of the present invention.

In step S201 of the flowchart of FIG. 3, similarly to the above-described step S101, control apparatus 8 determines whether the operation propagation of electric oil pump 7 has been completed, and when the operation propagation has been completed, then the operation proceeds to step S202.

In step S202, control apparatus 8 reads oil temperature TO (° C.) measured by temperature sensor 11.

In step S203, control apparatus 8 calculates a target revolution number (rpm) or a target flow rate (L/min) based on oil temperature TO.

Control apparatus 8 is provided with a translation table, a function, or the like, which represents a correlation between oil temperature TO and the target revolution number (rpm) or the target flow rate (L/min) in the driven state of forward-reverse switching mechanism 41, and calculates the target revolution number (rpm) or the target flow rate (L/min) on the basis of a measured value of oil temperature TO according to the correlation.

As oil temperature TO increases, control apparatus 8 sets a greater target revolution number (rpm) or a greater target flow rate (L/min). Thus, when the oil temperature is high, the oil flow rate is increased, so that cooling performance provided by circulation of the oil can be improved, and accordingly, an increase in oil temperature TO can be reduced.

However, the present invention is not limited to a configuration in which the target revolution number (rpm) or the target flow rate (L/min) of electric oil pump 7 is changed according to oil temperature TO. For example, control apparatus 8 may set the target revolution number (rpm) or the target flow rate (L/min) to be a fixed value.

In step S204, control apparatus 8 determines whether a drive request of electric oil pump 7 has been generated.

Here, the drive request of electric oil pump 7 is a command for requesting an insufficient flow rate to be compensated by the operation of electric oil pump 7 in a state in which the oil is circulated by mechanical oil pump 5.

For example, in a slipping state of forward clutch 41c, that is a friction engagement element, such as a multi-plate wet clutch, in order to increase a total oil flow rate by adding oil discharged from electric oil pump 7 to oil discharged by mechanical oil pump 5, control apparatus 8 sets the drive request of electric oil pump 7.

That is, when forward clutch 41c is in a disengaged state or in an engaged state without slipping, the amount of heat generated in forward clutch 41c may be small, and thus, an oil flow rate required for lubrication and cooling can be satisfied by the oil flow rate of the discharge from mechanical oil pump 5.

In contrast, when forward clutch 41c is in a slipping state, the heat generation amount may be large, and thus, the oil flow rate of the discharge of mechanical oil pump 5 may be insufficient for the lubrication and cooling. Thus, electric oil pump 7 is driven to achieve the sufficient oil flow rate for the lubrication and cooling.

Figure 4:
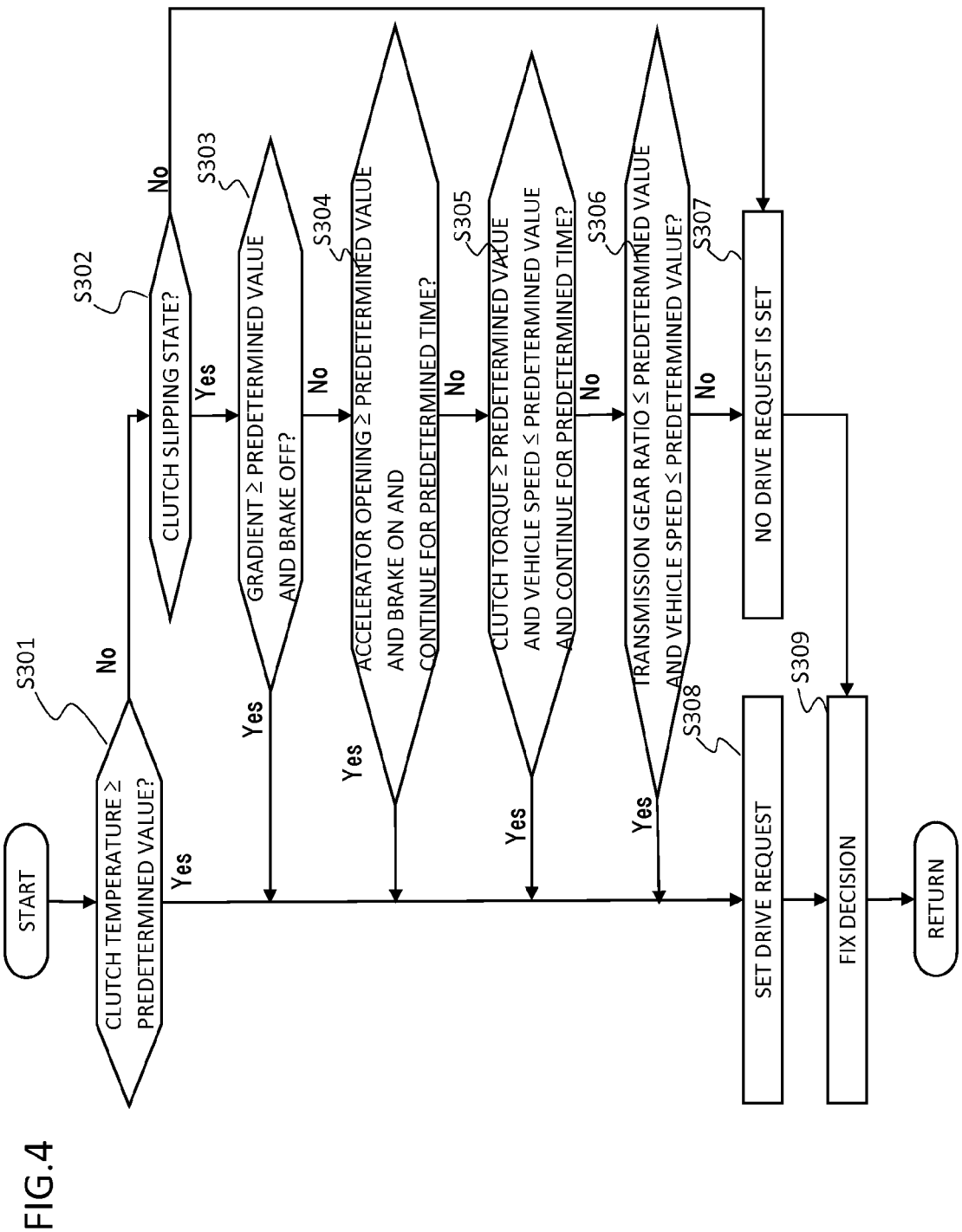
FIG. 4 is a flowchart illustrating a deciding process of a drive request of the electric oil pump in the driven state of the power transmission device, according to the embodiment of the present invention.

Control apparatus 8 detects the drive request of electric oil pump 7 in step S204 as illustrated in the flowchart of FIG. 4, for example.

In the flowchart of FIG. 4, control apparatus 8 determines in step S301 whether a temperature of forward clutch 41c is not less than a predetermined value.

Control apparatus 8 estimates the temperature of forward clutch 41c based on an input torque, a slipping rotational speed, or the like, of forward clutch 41c, or measures the temperature of forward clutch 41c based on a signal of the temperature sensor disposed in forward clutch 41c.

Furthermore, the predetermined value compared to the temperature of forward clutch 41c in step S301 is a threshold for determining whether it is required to increase the oil flow rate by operating the electric oil pump 7, and the predetermined value is a temperature, which is set using, as a standard, a temperature at which the temperature of forward clutch 41c exceeds an allowable temperature unless the oil flow rate is increased by electric oil pump 7.

When the temperature of forward clutch 41c is not less than the predetermined value, it is required to compensate for the insufficient oil flow rate by electric oil pump 7, and thus, the operation of control apparatus 8 proceeds to step S308, in which control apparatus 8 sets the drive request of electric oil pump 7.

In contrast, when the temperature of forward clutch 41c is less than the predetermined value, it is not required to drive electric oil pump 7 according to the temperature condition of forward clutch 41c. However, there may be a case in which it is required to drive electric oil pump 7 based on a condition other than the temperature condition of forward clutch 41c, and thus, the operation of control apparatus 8 proceeds processes of step S302 and thereafter.

In step S302, control apparatus 8 determines whether forward clutch 41c is in the slipping state or not based on a difference in rotational speed between an input and an output of forward clutch 41c.

Here, when forward clutch 41c is not in the slipping state, that is, when forward clutch 41c is in the disengaged state or in the engaged state without slipping, it is not required to increase the oil flow rate to cope with the heat generated by the slip.

Thus, when forward clutch 41c is not in the slipping state, the operation of control apparatus 8 proceeds to step S307, in which no drive request of electric oil pump 7 is set.

In contrast, when forward clutch 41c is in the slipping state, it may be required to increase the oil flow rate to cope with the heat generated by the slip, and thus, the operation of control apparatus 8 proceeds to a process of step S303.

In step S303, control apparatus 8 determines whether a road, on which the vehicle runs, has a steep upward slope, a gradient of which is greater than a predetermined value, and a vehicle brake is in an OFF state.

When the road, on which the vehicle runs, has a steep upward slope and the brake is in the OFF state, a load torque upon engaging forward clutch 41c to start the vehicle may be increased, and accordingly, it is expected that an amount of heat generated in the engaged process of forward clutch 41c may be increased.

Thus, the operation of control apparatus 8 proceeds to step S308, in which control apparatus 8 sets the drive request of electric oil pump 7.

In contrast, when control apparatus 8 determines in step S303 that the gradient condition and/or the brake condition is not satisfied, the operation proceeds to step S304, in which control apparatus 8 determines whether a state, in which accelerator opening ACC is not less than a predetermined opening and the brake is in an ON state, continues for a predetermined time period or more.

When the conditions of step S304 are satisfied, the vehicle is assumed to be in a situation in which the throttle pedal is pressed down with the brake pedal pressed, and then the brake pedal is released (OFF) with an output of engine 1 increased, to suddenly start the vehicle.

In such a situation, it may be expected that the input torque of forward clutch 41c is increased and the amount of heat generated in the engaged process of forward clutch 41c is increased. Thus, the operation of control apparatus 8 proceeds to step S308, in which control apparatus 8 sets the drive request of electric oil pump 7.

Furthermore, when control apparatus 8 determines in step S304 that the vehicle is not in the suddenly-started state, that is, at least one of the three conditions of accelerator opening ACC, the brake pedal and the duration is not satisfied, the operation proceeds to step S305.

In step S305, control apparatus 8 determines whether a state, in which the input torque of forward clutch 41c exceeds the predetermined value and a vehicle speed is not more than a predetermined value, continues for a predetermined time period or more.

When the conditions of step S305 are satisfied, the vehicle is in a situation in which a torque required to start the vehicle is increased due to an upward slope, an increased weight of a load, or the like. In this case, it is expected that the input torque of forward clutch 41c and the load torque may be increased, and the heat generated in the engaged process of forward clutch 41c may be increased.

Thus, the operation of control apparatus 8 proceeds to step S308, in which control apparatus 8 sets the drive request of electric oil pump 7.

In contrast, when control apparatus 8 determines in step S305 that the vehicle is not in the increased starting load state, that is, at least one of the three conditions of the input torque, the vehicle speed and the duration is not satisfied, the operation proceeds to step S306.

In step S306, control apparatus 8 determines whether a transmission gear ratio of continuously variable transmission mechanism 42 is not more than a predetermined value and vehicle speed VSP is not more than a predetermined value.

When the conditions of step S306 are satisfied, the vehicle is in such a state that the vehicle starts in a second gear position of a stepped variable transmission, and it is expected that the load torque may be increased and the amount of heat generated in the engaged process of forward clutch 41c may be increased.

Thus, the operation of control apparatus 8 proceeds to step S308, in which control apparatus 8 sets the drive request of electric oil pump 7.

In contrast, when control apparatus 8 determines in step S306 that the vehicle is not in the starting state in the second gear position, that is, at least one of the two conditions of the transmission gear ratio and the vehicle speed is not satisfied, the operation proceeds to step S307, in which the operation proceeds to step S307, in which control apparatus 8 does not set the drive request of electric oil pump 7.

When the vehicle is not in the starting state in the second gear position, control apparatus 8 decides that it is not required to drive electric oil pump 7, since the amount of heat generated in forward clutch 41c is not increased to an extent requiring the increase in oil flow rate even when forward clutch 41c is in the slipping state.

Furthermore, when control apparatus 8 sets that electric oil pump 7 is required or not required to be driven in steps S307 and S308, respectively, control apparatus 8 fixes this decision in step S309.

However, the determination process of the heat generation amount is not limited to those exemplified in steps S303-S306. Control apparatus 8 may estimate the heat generation amount of forward clutch 41c based on another process.

Furthermore, control apparatus 8 may determine the heat generation amount of forward clutch 41c in the disengaged process, to set that electric oil pump 7 is required or not required to be driven.

In step S204, control apparatus 8 discriminates the result of determination, that is, electric oil pump 7 is required or not required to be driven, obtained as described above, and when electric oil pump 7 is not required to be driven, the operation proceeds to step S207, in which control apparatus 8 stops electric oil pump 7.

Even when control apparatus 8 stops electric oil pump 7 in step S207, mechanical oil pump 5 is driven by engine 1, and the oil discharged from mechanical oil pump 5 is supplied to forward-reverse switching mechanism 41 and continuously variable transmission mechanism 42 via pressure adjusting mechanism 6. Thus, a required supply amount can be met.

In contrast, when control apparatus 8 determines in step S204 that the drive request of electric oil pump 7 has been set, the operation proceeds to step S205, in which the target revolution number (rpm) or the target flow rate (L/min) set in step S203 is set as an instruction value in the drive control of electric oil pump 7.

Then, in step S206, control apparatus 8 performs the PWM control on electric oil pump 7 based on the target revolution number (rpm) or the target flow rate (L/min).

In the PWM control based on the target revolution number (rpm), control apparatus 8 decides a duty cycle in the PWM control based on a difference between the target revolution number (rpm) and an actual pump revolution number (rpm), and then, control apparatus 8 performs the PWM control on a switching element in inverter 9 by means of an operation signal with the decided duty cycle.

In the above-mentioned control of electric oil pump 7 performed by control apparatus 8, in a case in which forward clutch 41c is in the slipping state and the amount of heat generated in forward clutch 41c is large, and furthermore, the amount of heat tends to increase, the oil is supplied to forward clutch 41c from electric oil pump 7 in addition to the oil supplied to forward clutch 41c from mechanical oil pump 5.

Thus, the cooling performance of forward clutch 41c provided by the oil can be improved, and the increase in temperature of forward clutch 41c can be reduced.

As described above, in the driven state of forward-reverse switching mechanism 41, control apparatus 8 operates electric oil pump 7 when the heat generation amount increases in the slipping state of forward clutch 41c, to thereby increase the oil flow rate.

Since mechanical oil pump 5 is driven by engine 1, the discharged flow rate is low when the pump rotational speed in the vehicle starting state is low, and as the vehicle speed increases, that is, as a rotational speed of engine 1 increases, the discharge flow rate of mechanical oil pump 5 increases, as illustrated in FIG. 5A.

In contrast, forward clutch 41c generates heat in the slipping state in the engaged process, and the condition in which forward clutch 41c generates heat is a condition in which the vehicle speed at start acceleration is low.

That is, the discharge amount of mechanical oil pump 5 is small in the condition in which forward clutch 41c generates heat, and accordingly, the oil discharged from mechanical oil pump 5 cannot sufficiently cool forward clutch 41c in the start acceleration state.

Thus, as illustrated in FIG. 5A, the oil discharged from electric oil pump 7 is added to the oil discharged from mechanical oil pump 5, so that the oil flow rate required to cool forward clutch 41c is obtained by the oil discharged from both pumps 5, 7.

A timing diagram of FIG. 6A illustrates an example of a control pattern of electric oil pump 7 performed by control apparatus 8 in the driven state of forward-reverse switching mechanism 41.

In the timing diagram of FIG. 6A, when a shift range is switched from a neutral range to a drive range at time t1, control apparatus 8 performs an engaging operation of forward clutch 41c.

At time t2, control apparatus 8 starts up electric oil pump 7 based on that the input torque of forward clutch 41c exceeds a set value due to an accelerator opening operation. Furthermore, at time t3, control apparatus 8 stops electric oil pump 7 based on that forward clutch 41c shifts to a state in which forward clutch 41c is in the engaged state without slipping.

Furthermore, at time t4, due to deceleration, forward clutch 41c shifts to the slipping state, and still further, shifts to a state in which forward clutch 41c is driven by axle 20 side, resulted in an increased difference in rotational speed between the input and the output of forward clutch 41c. Thus, control apparatus 8 starts up electric oil pump 7 again. Then, at time t5, control apparatus 8 stops electric oil pump 7 in accordance with convergence of the deceleration.

Moreover, at time t6, control apparatus 8 starts up electric oil pump 7 to cope with an increase in input torque caused by a press of the throttle pedal in the slipping state of forward clutch 41c. Then, at time t7, control apparatus 8 stops electric oil pump 7 when the throttle pedal is released.

The above-described processes of control apparatus 8 illustrated in the flowcharts of FIGS. 3 and 4 are processes performed in a case in which control apparatus 8 determines that forward-reverse switching mechanism 41 is in the driven state in step S102 of the flowchart of FIG. 2 and the operation proceeds to step S114.

In contrast, when control apparatus 8 determines that forward-reverse switching mechanism 41 is in the non-driven state in step S102, the operation proceeds to processes of step S103 and thereafter.

Here, the non-driven state of forward-reverse switching mechanism 41 refers to a state in which forward-reverse switching mechanism 41 is not operated and motor generator 3 is not operated and accordingly does not generate a torque.

In step S103, control apparatus 8 reads the measured value of oil temperature TO.

Next, in step S104, control apparatus 8 calculates the target revolution number (rpm) or the target flow rate (L/min) of electric oil pump 7 based on oil temperature TO (° C.).

Control apparatus 8 is provided with a translation table, a function, or the like, which represents a correlation between oil temperature TO and the target revolution number (rpm) or the target flow rate (L/min) in the non-driven state of forward-reverse switching mechanism 41, and calculates the target revolution number (rpm) or the target flow rate (L/min) on the basis of the measured value of oil temperature TO according to the correlation.

Similarly to a case in which forward-reverse switching mechanism 41 is in the driven state, as oil temperature TO increases, control apparatus 8 sets a greater target revolution number (rpm) or a greater target flow rate (L/min).

Thus, when the oil temperature is high, the oil flow rate is increased, so that the cooling performance provided by the circulation of the oil can be improved, and accordingly, an increase in oil temperature TO can be reduced.

Here, in the non-driven state of forward-reverse switching mechanism 41, since an engagement torque of forward clutch 41c is not generated and since the input torque of forward-reverse switching mechanism 41 is small, the amount of heat generated in forward clutch 41c becomes less than that in the driven state.

Thus, control apparatus 8 sets a lower target revolution number (rpm) or a lower target flow rate (L/min) in the non-driven state than that in the driven state at the same oil temperature TO.

Figure 7:
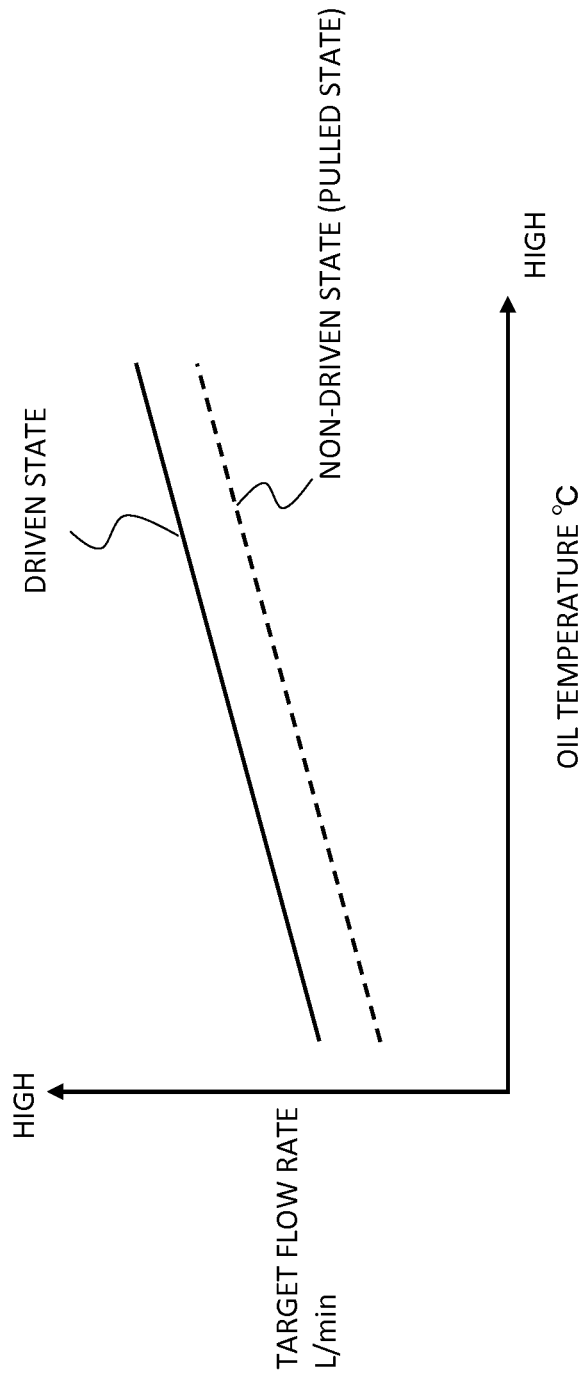
FIG. 7 is a diagram illustrating target flow rate of the electric oil pump in the driven state and in the non-driven state of the power transmission device, according to the embodiment of the present invention.

FIG. 7 is a view illustrating a correlation between oil temperature TO and the target flow rate (L/min) in the driven state of forward-reverse switching mechanism 41, and a correlation between oil temperature TO and the target flow rate (L/min) in the non-driven state of forward-reverse switching mechanism 41.

Control apparatus 8 sets a greater target flow rate (L/min) as oil temperature TO increases, in both of the driven state and the non-driven state of forward-reverse switching mechanism 41. However, at the same oil temperature TO, control apparatus 8 sets a greater target flow rate (L/min) applied in the driven state than the target flow rate (L/min) applied in the non-driven state.

In this case, the target revolution number (rpm) or the target flow rate (L/min) may be set to any value which can achieve flow rate required for the lubrication or the cooling at least, and is not limited to the properties as illustrated in FIG. 7. Furthermore, control apparatus 8 may eliminate the changing process of the target revolution number (rpm) or the target flow rate (L/min) based on oil temperature TO, and may drive electric oil pump 7 based on a previously set constant target revolution number (rpm) or target flow rate (L/min).

In step S105 of the flowchart of FIG. 2, control apparatus 8 determines whether vehicle speed VSP is not less than a first set speed.

The first set speed in step S105 is a value for determining whether the vehicle runs by being pulled by another vehicle, that is, whether the vehicle is in a pulled state. Then, when vehicle speed VSP is not less than the first set speed in the non-driven state of forward-reverse switching mechanism 41, it is estimated that the vehicle may be in the pulled state.

Here, when the vehicle is stopped in a neutral state, control apparatus 8 determines that vehicle speed VSP is less than the first set speed, and then the operation proceeds to step S110, in which control apparatus 8 stops electric oil pump 7.

When the vehicle is stopped in the neutral range or in a low speed state just before the stop, the increase in temperature of forward clutch 41c or a running out of oil can be reduced even when mechanical oil pump 5 is stopped, and thus, control apparatus 8 stops electric oil pump 7, to suppress unnecessary power consumption.

Furthermore, when engine 1 is in a driven state and forward-reverse switching mechanism 41 is in the non-driven state, engine 1 drives mechanical oil pump 5, and accordingly, the oil for lubrication and cooling is supplied from mechanical oil pump 5 to forward-reverse switching mechanism 41. Thus, it is not required to drive electric oil pump 7.

In contrast, when engine 1 is in a stopped state and forward-reverse switching mechanism 41 is in the non-driven state, mechanical oil pump 5 is stopped, and accordingly, no oil is supplied from mechanical oil pump 5 to forward-reverse switching mechanism 41.

However, when the vehicle is stopped or the vehicle runs at low speed, the input torque and the slipping rotational speed of forward clutch 41c are small and the heat generation amount is also small even when forward-reverse switching mechanism 41 is driven to rotate by axle 20 side, and thus, the overheating or the running out of lubricant of forward-reverse switching mechanism 41 can be sufficiently reduced without driving electric oil pump 7.

Thus, when control apparatus 8 determines in step S105 that vehicle speed VSP is less than the first set speed, the operation proceeds to step S110, in which control apparatus 8 stops electric oil pump 7.

In contrast, when vehicle speed VSP is not less than the first set speed, control apparatus 8 estimates that the vehicle may be pulled in a state in which operations of engine 1 and motor generator 3 are stopped, that is, in a state in which mechanical oil pump 5 is stopped, and estimates that the heat generated in forward-reverse switching mechanism 41 may be high due to the high vehicle speed.

That is, the running of the vehicle in a state in which a drive force of engine 1 or motor generator 3 is not transmitted to axle 20 may include running by inertia and running by being pulled. Even when the vehicle runs in a state in which the drive force is not transmitted to axle 20, forward-reverse switching mechanism 41 generates heat since forward-reverse switching mechanism 41 is driven by axle 20 side, and thus, the heat generation amount increases as the vehicle speed increases and accordingly the rotation of forward-reverse switching mechanism 41 increases.

Thus, control apparatus 8 determines in step S105 that vehicle speed VSP is not less than the first set speed, the operation proceeds to step S106, in which control apparatus 8 drives electric oil pump 7 based on the target revolution number (rpm) or the target flow rate (L/min) set in step S104, to supply oil discharged from electric oil pump 7 to forward-reverse switching mechanism 41 for the lubrication and cooling.

Furthermore, in step S106, control apparatus 8 generates a drive experience flag that is a flag for detecting that electric oil pump 7 has been driven.

In general, a vehicle is pulled with the operations of engine 1 and motor generator 3 stopped, and accordingly, mechanical oil pump 5 is stopped at this time. However, since the rotational drive torque is transmitted to forward-reverse switching mechanism 41 from axle 20 side, forward-reverse switching mechanism 41 generates heat.

Figure 5B:
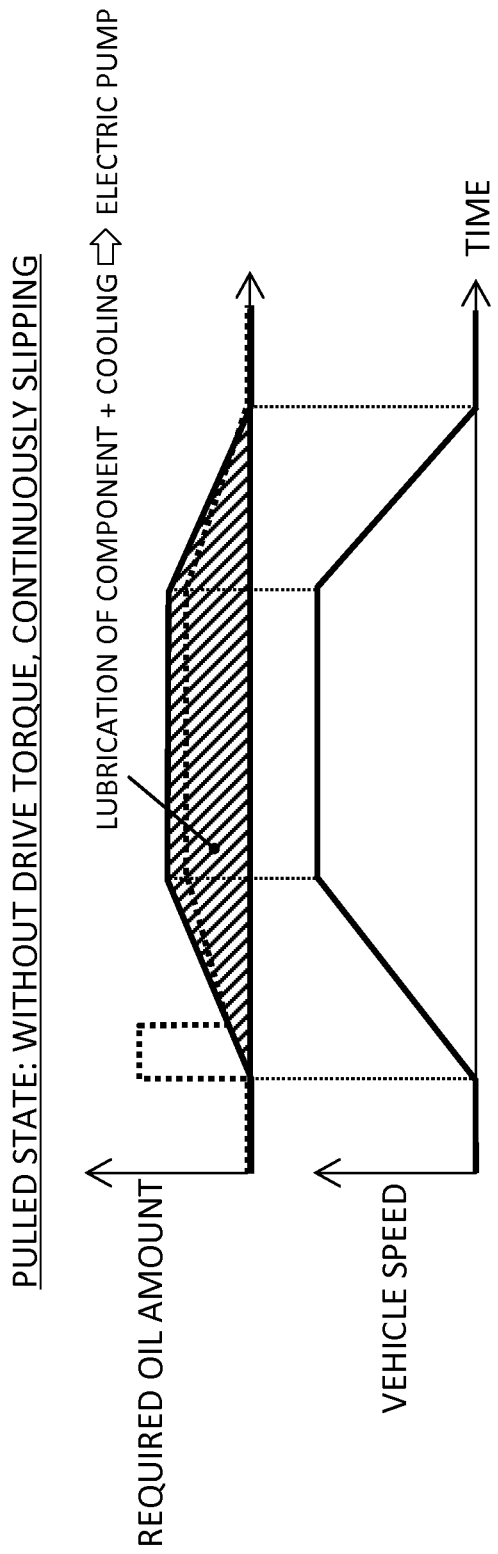

In such a pulled state, by supplying the oil for lubrication and cooling from electric oil pump 7 to forward-reverse switching mechanism 41, the overheating and the running out of the lubricant of forward-reverse switching mechanism 41 in the pulled state can be reduced, as illustrated in FIG. 5B.

Furthermore, since control apparatus 8 sets the target revolution number (rpm) or the target flow rate (L/min) of electric oil pump 7 based on oil temperature TO, excess oil can be prevented from being discharged from electric oil pump 7 in the state in which the heat generation amount is small, that is, the unnecessary power consumption can be reduced in a state in which engine 1 is stopped and battery 22 is not charged.

Control apparatus 8 may set the target revolution number (rpm) or the target flow rate (L/min) of electric oil pump 7 based on oil temperature TO and vehicle speed VSP, and thus, control apparatus 8 may set a greater target revolution number (rpm) or a greater flow rate (L/min) as oil temperature TO increases even in the same vehicle speed VSP, whereas control apparatus 8 may set a greater target revolution number (rpm) or a greater flow rate (L/min) as vehicle speed VSP increases even in the same oil temperature TO.

Furthermore, control apparatus 8 may set the target revolution number (rpm) or the target flow rate (L/min) of electric oil pump 7 based on vehicle speed VSP without using information of oil temperature TO. In this case, control apparatus 8 may set a greater target revolution number (rpm) or a greater flow rate (L/min) as vehicle speed VSP increases.

In the pulled state in which forward-reverse switching mechanism 41 is driven to rotate by axle 20 side, the rotational speed difference between the input and the output of forward clutch 41c increases as the vehicle speed increases, and as the rotational speed difference increases, the heat generation amount increases. Thus, control apparatus 8 sets a greater target revolution number (rpm) or a greater flow rate (L/min) as vehicle speed VSP increases.

Furthermore, as the state in which forward-reverse switching mechanism 41 is in the non-driven state and vehicle speed VSP is not less than the first set speed, the inertial running is included as described above.

However, when the vehicle runs by inertia in a state in which engine 1 is in the driven state, mechanical oil pump 5 is driven to be in the driven state, and supplies the oil to forward-reverse switching mechanism 41, so that oil temperature TO can be reduced to be low.

Thus, when control apparatus 8 sets the target revolution number (rpm) or the target flow rate (L/min) based on oil temperature TO in the inertial running state, control apparatus 8 sets a lower target revolution number (rpm) or a lower target flow rate (L/min), or sets a stop command of electric oil pump 7.

In step S107, control apparatus 8 determines whether or not forward-reverse switching mechanism 41 is switched from the non-driven state to the driven state, that is, is switched from the neutral range to the drive range.

Here, when forward-reverse switching mechanism 41 is switched from the non-driven state to the driven state, it is indicated that the vehicle is not in the pulled state and mechanical oil pump 5 is driven by engine 1.

Thus, the operation of control apparatus 8 proceeds to step S114, in which control apparatus 8 performs control that makes electric oil pump 7 supply oil to cope with the heat generated in the engaged process of forward clutch 41c.

In contrast, when the non-driven state of forward-reverse switching mechanism 41 continues, the operation of control apparatus 8 proceeds to step S108, in which control apparatus 8 determines whether an operating time of electric oil pump 7 becomes a first set time or more.

The first set time in step S108 is a maximum time for which the continuous operation of electric oil pump 7 can be allowed, and is based on consumption of battery 22 with respect to the operating time, or based on an increase in temperature of electric oil pump 7 or inverter 9 with respect to the operating time.

When the operating time of electric oil pump 7 becomes the first set time or more, the operation of control apparatus 8 proceeds to step S110, in which control apparatus 8 stops electric oil pump 7, to suppress the consumption of battery 22 or the increase in temperature of inverter 9 and the like.

In contrast, when control apparatus 8 determines in step S108 that the operating time of electric oil pump 7 is less than the first set time, the operation proceeds to step S109, in which control apparatus 8 determines whether vehicle speed VSP is less than a second set speed.

Here, the second set speed in step S109 is less than the first set speed in step S105, and thus, hunting of drive and stop control of electric oil pump 7 based on the vehicle speed can be reduced.

When vehicle speed VSP becomes less than the second set speed in a state in which electric oil pump 7 is driven, that is, when the vehicle in the pulled state is briefly stopped at an intersection or parked due to completion of transferring the vehicle to a destination, or the like, the amount of heat generated in forward-reverse switching mechanism 41 decreases, and thus, it becomes unnecessary to supply oil from electric oil pump 7 even when mechanical oil pump 5 is in the stopped state.

Thus, when vehicle speed VSP becomes less than the second set speed in a state in which electric oil pump 7 is driven, the operation of control apparatus 8 proceeds to step S110, in which control apparatus 8 stops electric oil pump 7.

In contrast, when a state in which vehicle speed VSP is not less than the second set speed is maintained, forward-reverse switching mechanism 41 generates heat since it is driven to rotate by the axle 20 side, and accordingly, it is necessary to supply oil from electric oil pump 7. Thus, the operation of control apparatus 8 returns to step S106, in which control apparatus 8 continues driving electric oil pump 7.

When the operation of control apparatus 8 proceeds to step S110, to stop electric oil pump 7, the operation next proceeds to step S111, in which control apparatus 8 determines whether the drive experience flag of electric oil pump 7 has been generated.

Then, when the drive experience flag has been generated, that is, when there is a history that although electric oil pump 7 was driven in the non-driven state of forward-reverse switching mechanism 41, electric oil pump 7 was stopped thereafter in the process of step S108 or S109, the operation of control apparatus 8 proceeds to step S112.

In step S112, control apparatus 8 determines whether a continuously stopping time of electric oil pump 7 becomes a second set time or more.

Here, when control apparatus 8 determines that the stopping time of electric oil pump 7 is less than the second set time, the operation returns to step S110, in which control apparatus 8 makes electric oil pump 7 continue stopping.

In contrast, when control apparatus 8 determines that the stopping time of electric oil pump 7 becomes the second set time or more, the operation proceeds to step S113, in which control apparatus 8 performs a process of deleting the drive experience flag, that is, a process of resetting the drive experience flag.

When control apparatus 8 performs the resetting process of the flag in step S113, the operation returns to step S101, and when control apparatus 8 determines in step S101 that the pulled state of the vehicle continues, control apparatus 8 drives electric oil pump 7 again.

Thus, control apparatus 8 intermittently drives electric oil pump 7 when the pulled state of the vehicle continues, so that the consumption of battery 22 can be reduced and the increase in temperature of forward-reverse switching mechanism 41, electric oil pump 7, and the like, can be reduced.

Here, to reduce the consumption of battery 22 consumed by driving electric oil pump 7 in the pulled state, control apparatus 8 may perform regeneration control that converts a drive force of the pulling to electric power, to charge battery 22 with regenerative electric power.

Furthermore, control apparatus 8 may automatically start up engine 1 in the pulled state, to cause engine 1 to drive an alternator (not illustrated), to thereby charge battery 22 with electric power generated by the alternator.

Still further, control apparatus 8 may perform the regeneration control and the automatic startup control of engine 1 when control apparatus 8 determines that battery 22 is consumed by a predetermined degree or more by driving electric oil pump 7 in the pulled state.

Here, control apparatus 8 may determine whether battery 22 is consumed based on a operating time of electric oil pump 7, or control apparatus 8 may determine whether battery 22 is consumed based on a voltage of battery 22, power consumption of electric oil pump 7 or the like.

Furthermore, since the power consumption of electric oil pump 7 increases as an oil temperature decreases and as viscosity of the oil increases, control apparatus 8 may change the first set time of the operating time in step S108 to a shorter time as the oil temperature decreases.

Thus, the consumption of battery 22 can be reduced while lengthening a driving time of electric oil pump 7 as much as possible, so that forward-reverse switching mechanism 41 can be sufficiently lubricated and cooled by the oil supplied from electric oil pump 7.

FIG. 6B illustrates the relationship between an operation state, such as the vehicle speed, and an operation state of electric oil pump 7, in the non-driven state of forward-reverse switching mechanism 41, that is, in the pulled state of the vehicle.

In FIG. 6B, at time t8 in which vehicle speed VSP increases by being pulled, that is, at a time in which the difference in rotational speed between the input and the output of forward clutch 41c occurs, control apparatus 8 starts driving electric oil pump 7.

When control apparatus 8 starts driving electric oil pump 7 at time t8, control apparatus 8 continues driving electric oil pump 7 until time t9, at which the vehicle stops, arrives.

Between time t8 and time t9, control apparatus 8 increases the rotational speed of electric oil pump 7 according to an increase in oil temperature due to an increase in heat generation amount caused by an increase in vehicle speed, whereas control apparatus 8 performs control which decreases the rotational speed of electric oil pump 7 according to a decrease in oil temperature due to a decrease in heat generation amount caused by a decrease in vehicle speed.

Here, although control apparatus 8 may drive electric oil pump 7 at a constant rotational speed, control apparatus 8 may change the pump rotational speed according to the vehicle speed or the oil temperature, to thereby reduce the increase in temperature of forward-reverse switching mechanism 41 while reducing the power consumption of electric oil pump 7 as much as possible.

That is, in FIG. 6B, control apparatus 8 also drives electric oil pump 7 between time t10 and time t11; however, since the vehicle speed between time t10 and time t11 is less than that between time t8 and time t9, control apparatus 8 suppresses the rotational speed of electric oil pump 7 to be low between time t10 and time t11, to suppress the power consumption.

In the example of the drive control of electric oil pump 7 illustrated in the flowchart of FIG. 2, control apparatus 8 switches the ON and OFF of electric oil pump 7 in the non-driven state of forward-reverse switching mechanism 41 according to vehicle speed VSP; however, control apparatus 8 may operate electric oil pump 7 according to a heat generating state of forward-reverse switching mechanism 41.

Figure 8:
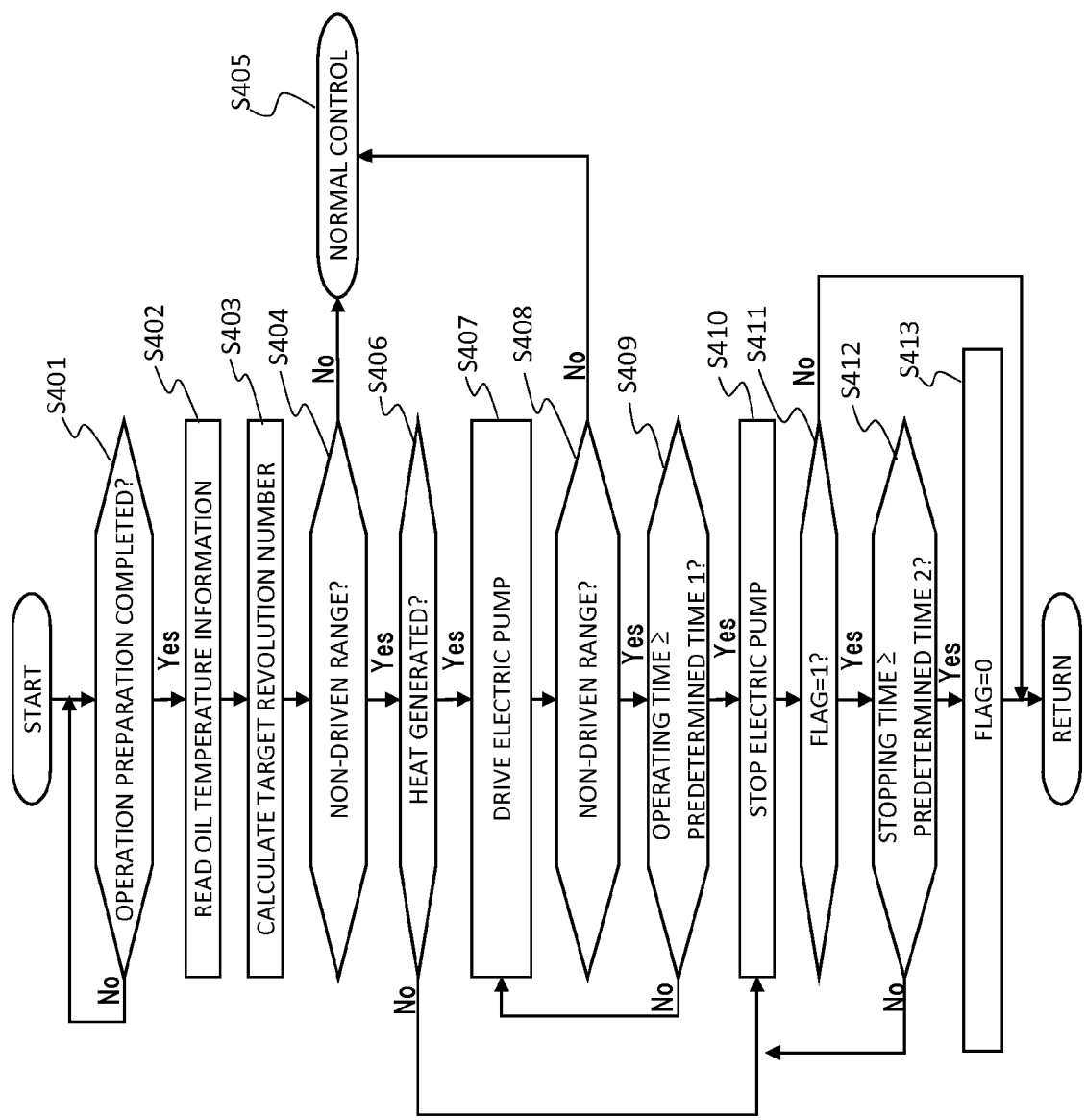
FIG. 8 is a flowchart illustrating control of the electric oil pump in the non-driven state of the power transmission device, according to the embodiment of the present invention.

A flowchart of FIG. 8 illustrates an example of control which operates electric oil pump 7 according to the heat generating state of forward-reverse switching mechanism 41 in the non-driven state of forward-reverse switching mechanism 41, this control being executed in control apparatus 8 instead of the routine illustrated in the flowchart of FIG. 2.

In the flowchart of FIG. 8, control apparatus 8 determines in step S401 whether the operation preparation of electric oil pump 7 has been completed, similarly to step S101.

Then, when the operation preparation of electric oil pump 7 has been completed, the operation of control apparatus 8 proceeds to step S402, in which control apparatus 8 reads oil temperature TO.

Next, in step S403, control apparatus 8 calculates the target revolution number (rpm) or the target flow rate (L/min) of electric oil pump 7 based on oil temperature TO (° C.), similarly to step S104.

In the next step S404, control apparatus 8 determines whether forward-reverse switching mechanism 41 is in the non-driven state, similarly to step S102.

When forward-reverse switching mechanism 41 is in the driven state, the operation of control apparatus 8 proceeds to step S405, in which control apparatus 8 controls the operation of electric oil pump 7 according to the flowcharts of FIGS. 3 and 4 as described above.

In contrast, when forward-reverse switching mechanism 41 is in the non-driven state, the operation of control apparatus 8 proceeds to step S406, in which control apparatus 8 determines whether forward-reverse switching mechanism 41 is in the heat generating state, based on oil temperature TO, for example.

Here, control apparatus 8 may store an initial value of oil temperature TO in the non-driven state of forward-reverse switching mechanism 41, and control apparatus 8 may determine that forward-reverse switching mechanism 41 is in the heat generating state when oil temperature TO increases from this initial value by a predetermined value or more.

Furthermore, as a threshold, control apparatus 8 may set a temperature, which oil temperature TO exceeds when forward-reverse switching mechanism 41 generates heat, and control apparatus 8 may determine that forward-reverse switching mechanism 41 is in the heat generating state when oil temperature TO exceeds the threshold.

In step S406, control apparatus 8 may measure a temperature which represents a temperature of forward-reverse switching mechanism 41 or a temperature correlating with a temperature of forward-reverse switching mechanism 41, such as a temperature of forward clutch 41c, a temperature of a bearing included in forward-reverse switching mechanism 41 or a coil temperature of motor generator 3, and control apparatus 8 may determine whether forward-reverse switching mechanism 41 is in the heat generating state based on an increase in the measured temperature.

When control apparatus 8 determines in step S406 that forward-reverse switching mechanism 41 is in the heat generating state, the operation proceeds to step S407, in which control apparatus 8 drives electric oil pump 7 based on the target revolution number (rpm) or the target flow rate (L/min) set in step S403.

Next, in step S408, control apparatus 8 determines whether forward-reverse switching mechanism 41 is switched to the driven state, and when forward-reverse switching mechanism 41 is switched from the non-driven state to the driven state, the operation proceeds to step S405.

In contrast, when the non-driven state of forward-reverse switching mechanism 41 continues, the operation of control apparatus 8 proceeds to step S409, in which control apparatus 8 determines whether the operating time of electric oil pump 7 becomes the first set time or more, similarly to step S108.

Then, when the operating time of electric oil pump 7 is less than the first set time, the operation of control apparatus 8 returns to step S407, in which control apparatus 8 continues driving electric oil pump 7.

In contrast, when the operating time of electric oil pump 7 becomes the first set time or more, the operation of control apparatus 8 proceeds to step S410, in which control apparatus 8 stops electric oil pump 7, to reduce the consumption of battery 22 and the increase in temperature of electric oil pump 7.

When control apparatus 8 stops electric oil pump 7 in step S410, the operation then proceeds to step S411, in which control apparatus 8 determines whether the electric oil pump drive experience flag has been generated.

Then, when the electric oil pump drive experience flag has been generated and when electric oil pump 7 is driven in the non-driven state of forward-reverse switching mechanism 41, the operation of control apparatus 8 proceeds to step S412.

In step S412, control apparatus 8 determines whether the stopping time of electric oil pump 7 becomes the second set time or more.

Then, when the stopping time of electric oil pump 7 is less than the second set time, the operation of control apparatus 8 returns to step S410, in which control apparatus 8 makes electric oil pump 7 continue stopping, whereas when the stopping time becomes the second set time or more, the operation proceeds to step S413, in which control apparatus 8 performs the resetting process that deletes the electric oil pump drive experience flag.

When the pulled state continues after the operation returns to step S401 after performing the resetting process that deletes the electric oil pump experience flag, control apparatus 8 drives electric oil pump 7 again.

Thus, electric oil pump 7 is intermittently operated when the pulled state of the vehicle continues, and thus, the consumption of battery 22 can be reduced, and the increase in temperature of forward-reverse switching mechanism 41 and electric oil pump 7 can be reduced.

In this case, as described above, control apparatus 8 performs the PWM control on motor 7a of electric oil pump 7, and control apparatus 8 has a function for changing a PWM frequency in the PWM control, that is, a drive frequency of electric oil pump 7, according to a vehicle state.

A drive noise can be reduced when the PWM frequency of the PWM control of electric oil pump 7 is increased. However, as the PWM frequency increases, the amount of heat generated in inverter 9 increases, and thus, if the operating time of electric oil pump 7 continues for longer time than expected, the temperature of inverter 9 may exceed a heat resistance limit.

Thus, by changing the PWM frequency according to the vehicle state, control apparatus 8 suppresses a decrease in sale value due to the increase in the drive noise of electric oil pump 7, and prevents inverter 9 from being damaged by the generated heat by suppressing the amount of heat generated in inverter 9 within an allowable range.

Next, an example of variable control of PWM frequency performed by control apparatus 8 will be described with reference to a flowchart of FIG. 9.

Figure 9:
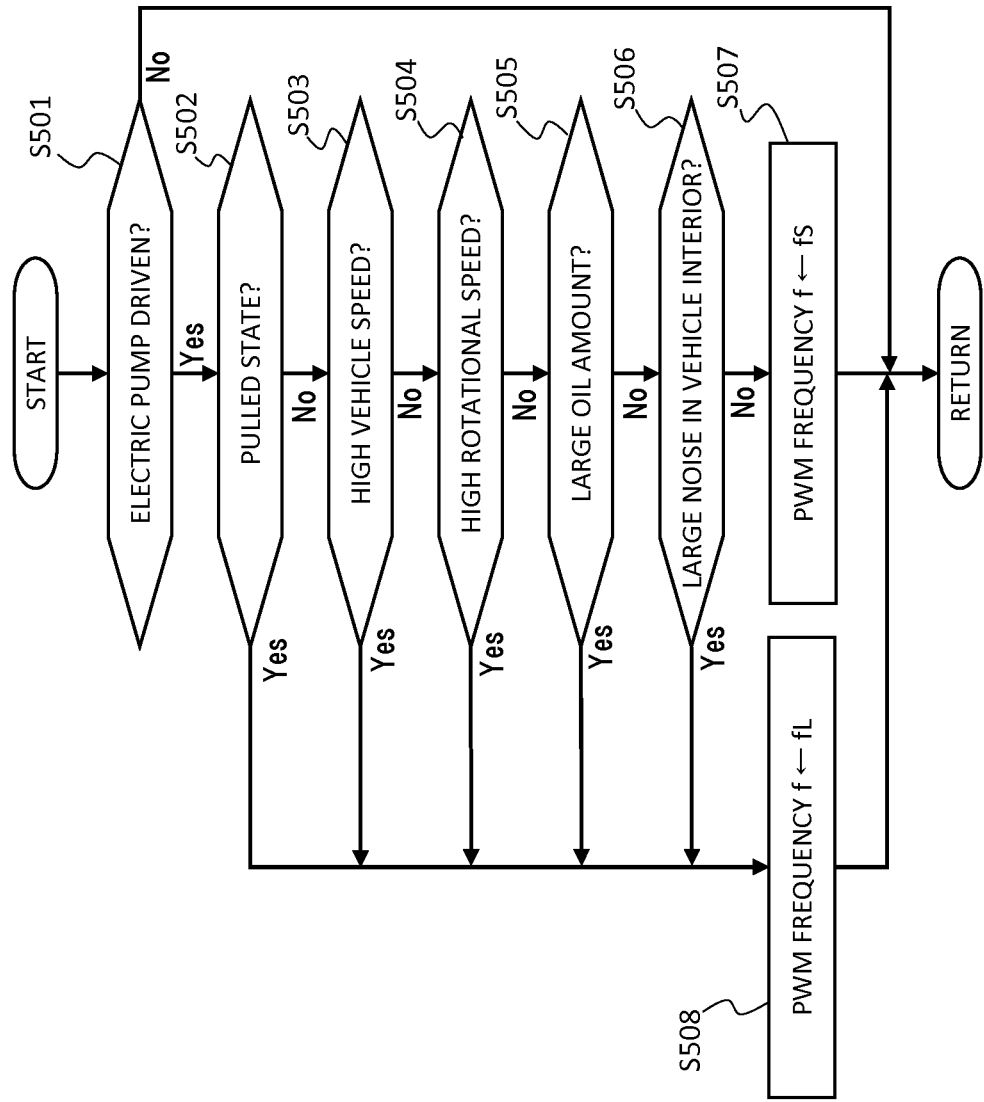
FIG. 9 is a flowchart illustrating a changing process of a drive frequency of the electric oil pump according to the embodiment of the present invention.

A routine illustrated in the flowchart of FIG. 9 is executed by control apparatus 8 in a state in which the engine switch of the vehicle is turned on and thus power is applied to control apparatus 8.

First, control apparatus 8 determines in step S501 whether a condition for driving electric oil pump 7 is satisfied or not, that is, whether the vehicle is in a state in which the PWM control of motor 7a of electric oil pump 7 can be performed.

Here, when the vehicle is not in the condition for driving electric oil pump 7, it is not required to set PWM frequency, and thus, control apparatus 8 terminates the routine illustrated in the flowchart of FIG. 9.

In contrast, when the vehicle is in the condition for driving electric oil pump 7, the operation of control apparatus 8 proceeds to step S502, in which control apparatus 8 determines whether the vehicle is in the pulled state or not based on whether the forward-reverse switching mechanism 41 is in the non-driven state or not and based on the vehicle speed.

That is, control apparatus 8 determines that the vehicle is in the pulled state when forward-reverse switching mechanism 41 is in the non-driven state and when the vehicle speed is greater than a set speed.

When the vehicle is in the pulled state, the operation of control apparatus 8 proceeds to step S508, in which control apparatus 8 selects a PWM frequency $f_L$, which is lower than a standard PWM frequency $f_S$, as a PWM frequency f in the PWM control of electric oil pump 7.

In a memory, control apparatus 8 stores, as PWM frequency f, PWM frequency $f_S$ that prioritizes the reduction of drive noise over the suppression of the heat generation amount, and PWM frequency $f_L$ that prioritizes the suppression of the heat generation amount over the reduction of drive noise, as a control constant. Then, in step S508, control apparatus 8 sets so that PWM control is performed on electric oil pump 7 according to PWM frequency $f_L$ that prioritizes the suppression of the heat generation amount over the reduction of drive noise.

Since no occupant is in the vehicle in the pulled state of the vehicle, even if the noise increases, no one is given discomfort, and accordingly, the increase in noise does not decrease the sale value of the vehicle.

In contrast, since, in the pulled state of the vehicle, engine 1 and motor generator 3 are remained to be in an operation-stopped state, mechanical oil pump 5 is not operated, and thus, the lubrication and cooling of forward-reverse switching mechanism 41 may depend on the oil supplied from electric oil pump 7. Thus, in the pulled state of the vehicle, a ratio of time in which electric oil pump 7 is operated becomes greater than that in a normal running state, and thus, the amount of heat generated in inverter 9 increases.

Thus, when the vehicle is in the pulled state, control apparatus 8 lowers PWM frequency f in the PWM control of electric oil pump 7 than that in a self-propelled state in which the vehicle runs using engine 1 and motor generator 3 as a power source.

By such a lowering process of PWM frequency f, the amount of heat generated in inverter 9 and the power consumption in the pulled state of vehicle can be reduced, and inverter 9 can be prevented from being damaged by the heat and the buttery consumption in the pulled state can be reduced.

Furthermore, since the amount of heat generated in inverter 9 is reduced in the pulled state by lowering PWM frequency f in the PWM control, inverter 9 is not required to be provided with heat-radiating performance, which adapts to the PWM control at PWM frequency $f_S$, and thus, the increase in size and cost of inverter 9 can be reduced.

Thus, in the self-propelled state in which mechanical oil pump 5 is operated, electric oil pump 7 is secondarily used, to compensate for an insufficient discharge amount from mechanical oil pump 5 by an discharge amount from electric oil pump 7, and thus, electric oil pump 7 is hardly driven to discharge oil at a high flow rate for a long time.

In contrast, since mechanical oil pump 5 is stopped in the pulled state, electric oil pump 7 may be required to discharge oil at a high flow rate for a long time. In such a long time drive, in order to avoid an excess increase in temperature of inverter 9 even when the PWM control is performed at standard PWM frequency $f_S$, an improved heat-radiating performance may be required because the heat generation amount may be greater than that in the PWM control at lower PWM frequency $f_L$. Furthermore, to achieve the improved heat-radiating performance, inverter 9 may be increased in size and cost.

In contrast, when the PWM control is performed at PWM frequency $f_L$, the amount of heat generated in inverter 9 can be reduced compared to that in the PWM control at standard PWM frequency $f_S$, and accordingly, the increase in temperature of inverter 9 can be sufficiently reduced even in a less heat-radiating performance, and thus, the increases in size and cost due to the radiation equipment can be reduced.

Since, in the pulled state of the vehicle, it is desired that the consumption of battery 22 be reduced as much as possible, when the operation proceeds to step S508 in the pulled state of the vehicle, control apparatus 8 may lower PWM frequency f as a voltage of battery 22 decreases.

Furthermore, when electric oil pump 7 is driven in the pulled state of the vehicle, electric oil pump 7 is driven on condition that battery voltage VB exceeds a lower limit voltage, to suppress an excess discharge of battery 22, which is the power source. However, if the drive of electric oil pump 7 is stopped in response to the decrease in battery voltage VB, the lubrication and cooling of forward-reverse switching mechanism 41 may be insufficient.

Thus, when electric oil pump 7 is stopped during the drive of electric oil pump 7 according to the voltage condition of battery 22 and the like in the pulled state of the vehicle, control apparatus 8 may perform a warning process urging a driver and the like of a vehicle pulling the pulled vehicle to recognize that oil circulation by electric oil pump 7 is stopped and accordingly the lubrication and cooling of forward-reverse switching mechanism 41 may be insufficient.

As this warning process, control apparatus 8 may perform a process of automatically operating an in-vehicle device. Specifically, control apparatus 8 may perform some of or one of a process of automatically honking a car horn provided in the vehicle, a process of automatically turning on lights, such as a headlight, a process of automatically operating a wiper, a process of sending an email to an email address previously stored, and the like.

This email address may be an email address of the driver of the pulling vehicle, for example.

When control apparatus 8 determines, in step S502 of the flowchart in FIG. 9, that the vehicle is not in the pulled state, the operation proceeds to step S503, in which control apparatus 8 determines whether the vehicle runs at a high vehicle speed exceeding a set speed.

In the high speed running state of the vehicle, a noise level in the vehicle increases as a whole compared to that in a low speed running state, so that an allowable value of the drive noise of electric oil pump 7 increases, while a target discharge flow rate of electric oil pump 7 increases, so that the amount of heat generated in inverter 9 increases.

Thus, in the high speed running state of the vehicle, the operation of control apparatus 8 proceeds to step S508, in which control apparatus 8 selects, as PWM frequency f in the PWM control of electric oil pump 7, lower PWM frequency $f_L$ which is lower than standard PWM frequency $f_S$. That is, as the running speed of the vehicle increases, control apparatus 8 lowers PWM frequency f.

Thus, the decrease in sale value of the vehicle caused by the drive noise of electric oil pump 7 can be reduced, and the amount of heat generated in inverter 9 can be reduced, so that inverter 9 can be prevented from being damaged by the heat, and furthermore, the power consumption in inverter 9 can be reduced.

Furthermore, when control apparatus 8 determines in step S503 that the vehicle is not in the high speed running state, the operation proceeds to step S504, in which control apparatus 8 determines whether or not the engine 1 or motor generator 3, which is the power source of the vehicle, is in a high rotational speed state in which the rotational speed of engine 1 or motor generator 3 exceeds a set speed.

In the high rotational speed state in which the rotational speed of engine 1 or motor generator 3 exceeds the set speed, similarly to the high speed running state of the vehicle, the noise level in the vehicle increases as a whole, so that the allowable value of the drive noise of electric oil pump 7 increases, while the target discharge flow rate in electric oil pump 7 increases, so that the amount of heat generated in inverter 9 increases.

Thus, in the high rotational speed state of engine 1 or motor generator 3, the operation of control apparatus 8 proceeds to step S508, in which control apparatus 8 selects, as PWM frequency f in the PWM control of electric oil pump 7, lower PWM frequency $f_L$, which is lower than standard PWM frequency $f_S$. That is, as the rotational speed of engine 1 or motor generator 3 increases, control apparatus 8 changes PWM frequency f to a lower frequency.

Thus, the decrease in sale value of the vehicle caused by the drive noise of electric oil pump 7 can be reduced, and the amount of heat generated in inverter 9 can be reduced, so that inverter 9 can be prevented from being damaged by the heat, and furthermore, the power consumption in inverter 9 can be reduced.

Furthermore, when control apparatus 8 determines in step S504 that engine 1 or motor generator 3 is not in the high rotational speed state, the operation proceeds to step S505, in which control apparatus 8 determines whether electric oil pump 7 is in a large discharge amount state in which the target revolution number (rpm) or the target flow rate (L/min) of electric oil pump 7 exceeds a set value.

Electric oil pump 7 is set to discharge a larger discharge amount when the oil temperature is high, and the oil temperature increases when the vehicle is driven at a high load. Thus, in general, a state in which the discharge amount of electric oil pump 7 is large is a situation in which the allowable value in the drive noise of electric oil pump 7 increases, and in addition, the amount of heat generated in inverter 9 increases to increase the discharge amount.

Thus, in the state in which the discharge amount of electric oil pump 7 is large, the operation of control apparatus 8 proceeds to step S508, in which control apparatus 8 selects, as PWM frequency f in the PWM control of electric oil pump 7, lower PWM frequency $f_L$, which is lower than standard PWM frequency $f_S$. That is, as the discharge amount of electric oil pump 7 increases, control apparatus 8 changes PWM frequency f to a lower frequency.

Thus, the decrease in sale value of the vehicle caused by the drive noise of electric oil pump 7 can be reduced, and the amount of heat generated in inverter 9 can be reduced, so that inverter 9 can be prevented from being damaged by the heat, and furthermore, a power loss in inverter 9 can be reduced.

Furthermore, when control apparatus 8 determines in step S505 that electric oil pump 7 is not in the state in which the discharge amount of electric oil pump 7 is large, the operation proceeds to step S506, in which control apparatus 8 determines whether a vehicle interior of the vehicle is in a large noise state in which the noise level in the vehicle interior exceeds a set value.

Control apparatus 8 may determine whether the vehicle interior is in the large noise state, by using a microphone that converts sound in the vehicle interior to an electric signal, or may estimate the noise state based on the vehicle speed, the engine rotational speed, an opened and closed state of a window of the vehicle, airflow volume setting of an air conditioner, sound volume setting of an audio device, or the like.

As the noise in the vehicle interior increases, the allowable value of the drive noise of electric oil pump 7 increases, so that PWM frequency f can be set to a lower frequency. By lowering PWM frequency f, the amount of heat generated in inverter 9 and the power consumption can be reduced.

Thus, in the large noise state, the operation of control apparatus 8 proceeds to step S508, in which control apparatus 8 selects, as PWM frequency f in the PWM control of electric oil pump 7, lower PWM frequency $f_L$, which is lower than standard PWM frequency $f_S$. That is, as the noise in the vehicle interior increases, control apparatus 8 changes PWM frequency f to a lower frequency.

Thus, the decrease in sale value of the vehicle caused by the drive noise of electric oil pump 7 can be reduced, and the amount of heat generated in inverter 9 can be reduced, so that inverter 9 can be prevented from being damaged by the heat, and furthermore, the power consumption in inverter 9 can be reduced.

In contrast, when control apparatus 8 determines in step S506 that the vehicle interior is not in the large noise state, the operation proceeds to step S507, in which control apparatus 8 selects standard PWM frequency $f_S$, as PWM frequency f in the PWM control of electric oil pump 7.

Since standard PWM frequency $f_S$ is PWM frequency f which can suppress the drive noise of electric oil pump 7 to a sufficiently low level even in a condition in which a sound caused by another noise source is low, and accordingly, the decrease in sale value of the vehicle caused by the offensive drive noise of electric oil pump 7 can be reduced.

Technical ideas described in the above embodiments may be appropriately combined with each other and used, as long as no conflict occurs.

Furthermore, the foregoing description of the embodiments according to the present invention is provided for illustrative purposes only, and it is not for the purpose of limiting the invention, the invention as claimed in the appended claims and their equivalents.

The vehicle state in which changing of PWM frequency f is performed is not limited to the operation states determined in steps S502-S506, and control apparatus 8 may change PWM frequency f according to one or some of vehicle states determined in steps S502-S506.

Furthermore, when some of conditions of steps S502-S506 are satisfied, control apparatus 8 may select lower PWM frequency $f_L$ as PWM frequency f. For example, when the vehicle is in the pulled state (S502) and when the vehicle speed is high or the target revolution number (rpm) of electric oil pump 7 is high, control apparatus 8 may set PWM frequency $f_L$ as PWM frequency f.

Still further, as conditions in which PWM frequency f is changed, driving environments of the vehicle, such as unevenness of a road, a rain condition, a wind velocity, a condition of running in a tunnel, and the like, may be included in the conditions in which PWM frequency f is changed.

That is, since the noise level in the vehicle interior increases when a road has a greater unevenness, when it rains, when the wind velocity is high, or when the vehicle runs in a tunnel, PWM frequency f can be lowered. Here, control apparatus 8 may sense the unevenness of road based on, for example, a change in stroke amount of a vehicle suspension, control apparatus 8 may sense the rain condition based on, for example, an operation state of a vehicle wiper, and control apparatus 8 may sense that the vehicle runs in a tunnel based on, for example, location information of vehicle provided by a GPS or the like.

Furthermore, control apparatus 8 may gradually lower PWM frequency f according to an increase in vehicle speed or target revolution number (rpm).

Still further, control apparatus 8 may measure a temperature of inverter 9, and then when the temperature of inverter 9 exceeds a set temperature, control apparatus 8 may lower PWM frequency f to prioritize decreasing of the temperature even in a condition in which the drive noise of electric oil pump 7 may be easily recognized by an occupant.

Yet further, the vehicle may be provided with an economy mode that prioritizes fuel economy as a drive mode of the drive modes, and when a driver of the vehicle selects the economy mode, control apparatus 8 may lower PWM frequency f.

The entire contents of Japanese Patent Application No. 2013-147476, filed on Jul. 16, 2013, on which priority is claimed, are incorporated herein by reference.

While only select embodiments have been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and it is not for the purpose of limiting the invention, the invention as claimed in the appended claims and their equivalents.

What is claimed is:

1. A control apparatus that controls an electric oil pump of a vehicle that supplies oil to a power transmission device transmitting a drive force to an axle, the control apparatus comprising:
    a frequency setting unit that changes a PWM frequency of a motor of the electric oil pump depending on at least one of a state of a noise in an interior of the vehicle, whether the vehicle is in a pulled state or in a self-propelled state, and an oil discharge amount of the electric oil pump.

2. The control apparatus according to claim 1, wherein the frequency setting unit lowers the PWM frequency as the noise in the interior of the vehicle increases.

3. The control apparatus according to claim 1, wherein when the electric oil pump is driven in the pulled state of the vehicle, the frequency setting unit lowers the PWM frequency, compared to that in a state in which the electric oil pump is driven in the self-propelled state of the vehicle.

4. The control apparatus according to claim 1, wherein the frequency setting unit lowers the PWM frequency according to an increase in oil discharge amount of the electric oil pump.

5. The control apparatus according to claim 1, wherein when the electric oil pump is driven in the pulled state of the vehicle, the frequency setting unit lowers the PWM frequency according to a decrease in supply voltage of the electric oil pump.

6. The control apparatus according to claim 5, further comprising a warning unit that operates an in-vehicle device to warn about the decrease in supply voltage toward an outside when the supply voltage decreases in the pulled state of the vehicle.

7. The control apparatus according to claim 1, wherein when the electric oil pump is driven in the pulled state of the vehicle, the frequency setting unit lowers the PWM frequency compared to that in a state in which the electric oil pump is driven in the self-propelled state of the vehicle.

8. The control apparatus according to claim 7, wherein when the electric oil pump is driven in the pulled state of the vehicle, the frequency setting unit lowers the PWM frequency according to a decrease in supply voltage of the electric oil pump.

9. The control apparatus according to claim 1, wherein the control apparatus is provided with, as an oil pump which supplies oil to the power transmission device, a mechanical oil pump that is driven to rotate by a rotating shaft arranged between the power transmission device and a power source, together with the electric oil pump.

10. A control apparatus that controls an electric oil pump of a vehicle that supplies oil to a power transmission device transmitting a drive force to an axle, the control apparatus comprising:
   frequency setting means that changes a PWM frequency of a motor of the electric oil pump depending on at least one of a state of a noise in an interior of the vehicle, whether the vehicle is in a pulled state or in a self-propelled state, and an oil discharge amount of the electric oil pump.

11. A control method of controlling an electric oil pump of a vehicle that supplies oil to a power transmission device transmitting a drive force to an axle, the control method comprising the steps of:
   determining at least one of a state of a noise in an interior of the vehicle, whether the vehicle is in a pulled state or in a self-propelled state, and an oil discharge amount of the electric oil pump, as a state of the vehicle; and
   changing a PWM frequency of a motor of the electric oil pump according to the state of the vehicle.

12. The control method according to claim 11,
   wherein the step of determining the state of the vehicle comprises the step of obtaining the state of the noise in the interior of the vehicle, and
   wherein the step of changing the PWM frequency comprises the step of lowering the PWM frequency as the noise in the interior of the vehicle increases.

13. The control method according to claim 11,
   wherein the step of determining the state of the vehicle comprises the step of determining whether the vehicle is in the pulled state or in the self-propelled state, and
   wherein the step of changing the PWM frequency comprises the step of lowering the PWM frequency when the electric oil pump is driven in the pulled state of the vehicle, compared to that in a state in which the electric oil pump is driven in the self-propelled state of the vehicle.

14. The control method according to claim 11,
   wherein the step of determining the state of the vehicle comprises the step of measuring the oil discharge amount of the electric oil pump, and
   wherein the step of changing the PWM frequency comprises the step of lowering the PWM frequency according to an increase in oil discharge amount of the electric oil pump.

15. The control method according to claim 11, wherein the step of determining the state of the vehicle comprises the steps of:
   determining whether the vehicle is in the pulled state or not; and
   measuring a supply voltage of the electric oil pump, wherein
      the step of changing the PWM frequency comprises the step of lowering the PWM frequency according to a decrease in supply voltage of the electric oil pump, when the electric oil pump is driven in the pulled state of the vehicle.

16. The control method according to claim 15, further comprising the step of operating an in-vehicle device to warn about the decrease in supply voltage toward an outside when the supply voltage decreases in the pulled state of the vehicle.

* * * * *